Sept. 22, 1925.  F. L. SIMMONS  1,554,236

WATERPROOF MAGNETIC CHUCK

Filed Jan. 27, 1920   3 Sheets-Sheet 1

Inventor
Frank L. Simmons
By Attorney
George Ramsey

Sept. 22, 1925.  1,554,236
F L. SIMMONS
WATERPROOF MAGNETIC CHUCK
Filed Jan. 27, 1920  3 Sheets-Sheet 2
Fig. 3.
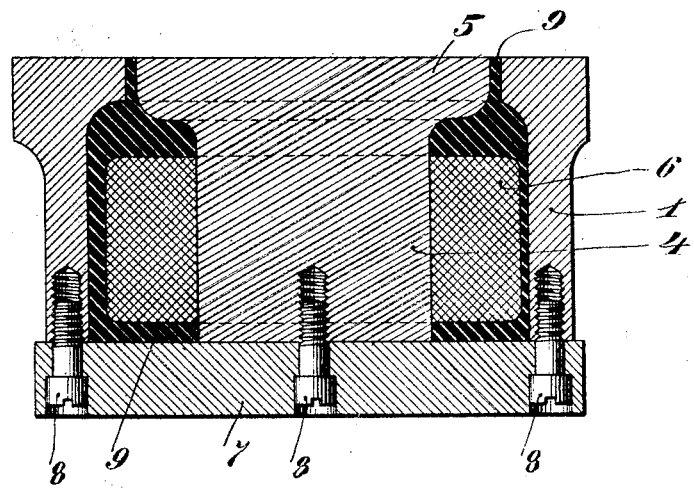
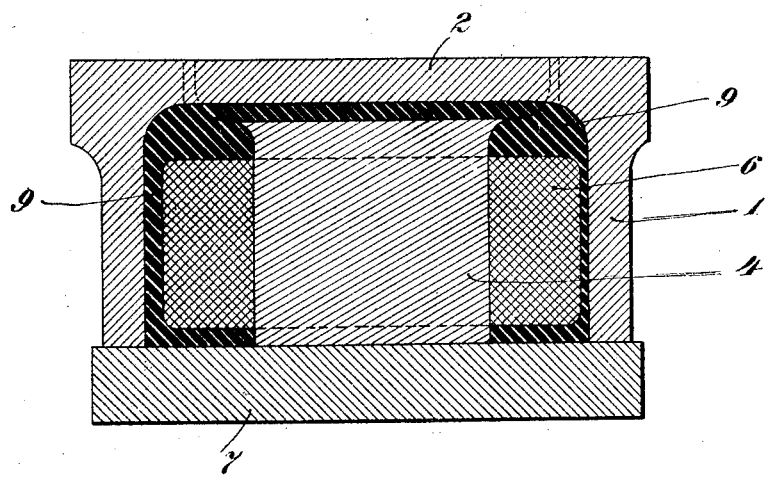
Fig. 4.
Inventor
Frank L. Simmons
By Attorney
George Ramsey Sept. 22, 1925.   1,554,236
F. L. SIMMONS
WATERPROOF MAGNETIC CHUCK
Filed Jan. 27, 1920   3 Sheets-Sheet 3

Inventor
Frank L. Simmons
By Attorney
George Ramsay

Patented Sept. 22, 1925.

1,554,236

UNITED STATES PATENT OFFICE.

FRANK L. SIMMONS, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

WATERPROOF MAGNETIC CHUCK.

Application filed January 27, 1920. Serial No. 354,506.

*To all whom it may concern:*

Be it known that I, FRANK L. SIMMONS, a citizen of the United States, residing at Woonsocket, in the county of Providence, State of Rhode Island, have invented certain new and useful Improvements in Waterproof Magnetic Chucks, of which the following is a specification.

This invention relates broadly to electrical apparatus, and more specifically to a waterproof magnetic chuck.

One of the principal objects of the present invention is a magnetic chuck constructed in such manner as to be completely waterproof and preferably without air gaps in the chuck construction.

Another object of the present invention is a magnetic chuck constructed without air gaps or voids in such manner that substantially the entire body of the chuck is filled with solid material.

Another object of the present invention is a magnetic chuck having the several elements of the chuck embedded in and supported by a phenol condensation insulating material in such manner that the entire body of the chuck is one solid mass of material.

A further object of the invention is a magnetic chuck having the pole pieces and coils embedded in a unitary piece of solid insulating material molded around the several parts of the chuck.

A still further object of the present invention is a magnetic chuck of the character specified wherein all of the several elements of the chuck are embedded in a phenol condensation product such as condensite, bakelite or the like.

Another object of the present invention is a magnetic chuck wherein the voids between the elements of the chuck are filled by a heat hardened compound forced into the chuck under pressure.

A still further object of the present invention is a magnetic chuck having a plurality of face plate pole pieces arranged side by side with the sides of certain of said pole pieces composed of curved lines and the sides of adjacent pole pieces composed of straight lines.

A still further object of the present invention is a magnetic chuck having the electrical wiring embedded in and supported by an insulating compound.

In view of the fact my invention may be embodied in many different structures, I desire the specific constructions herein described and shown shall be considered as illustrative and not in the limiting sense.

Throughout the drawings forming a part of this specification like parts are designated by like characters.

Figure 3 is a transverse cross-sectional view taken on line B—B, Figure 1.

Figure 4 is a transverse cross-sectional view taken on line C—C.

Figure 1:
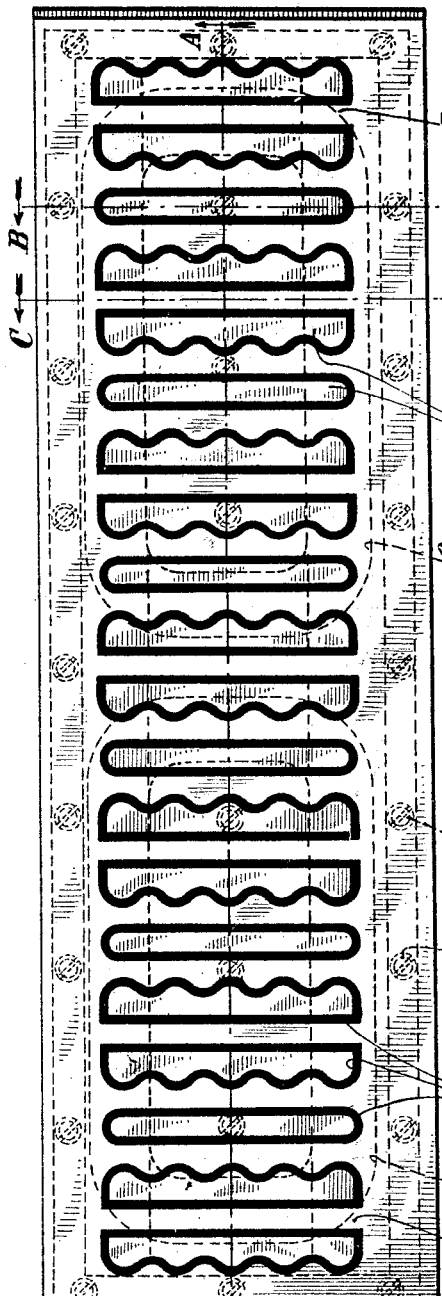
Figure 1 is a plan view of a chuck made in accordance with the present invention.
Figure 2:
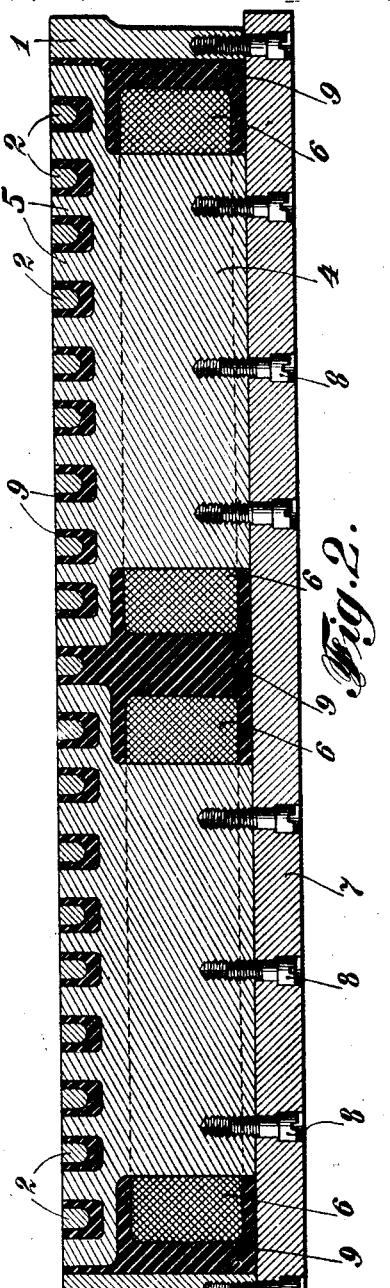
Figure 2 is a sectional elevational view taken on line A—A of Figure 1.

Heretofore in the art it has been customary to manufacture magnetic chucks by assembling face plate pole pieces in the desired arrangement, then filling the spaces between the pole pieces with a suitable non-magnetic material, usually Babbitt metal or the like, which could be pounded or penned between the poles in order to try to secure a watertight joint between the face plate pole pieces. Watertight joints are desirable because magnetic chucks are frequently used for wet grinding or for other purposes where the chuck is submerged in water or grinding fluids. It has been found that the Babbitt metal joint cannot be relied upon to be absolutely watertight and therefore it has been customary to use a thin plate of tin or brass positioned directly under the face plate pole pieces and forming the cover for the body of the box which contains the electric coils, etc. This plate interferes with the transmission of magnetism to the face plate pole pieces and it sometimes happens that water will leak in under this plate. When water leaks into the housing of a chuck, there is great liability of short circuits which may destroy the chuck and do other electrical damage.

In the manufacture of chucks there is also of necessity suitable connections between coils, and wires connecting the coils with suitable outlet boxes, etc. Because of more or less limited space it is customary to leave these wires free, and it sometimes happens that in the handling of chucks these wires move about and may either become loosened or the insulation may become abraded or broken, and short and open circuits occur for this reason.

Magnetic chucks are now being used with heavy duty machines and the result is that there is a tendency for the individual elements of the chuck to work loose and again, this tends to open up the seams and eventually cause the destruction of the chuck.

The present invention overcomes the difficulties of the known art by providing a magnetic chuck which is one solid mass of material from the face plate through to the back plate and wherein all the voids ordinarily to be found in the chuck are filled with a waterproof compound of sufficient hardness and strength to prevent movement of the parts under the most severe usage.

The preferred construction utilized in carrying out the present invention comprises a chuck wherein all of the space in the chuck other than that occupied by the metal parts, is filled with a phenol condensation product such as condensite or bakelite, and which, therefore, embeds and encloses the coils, the pole pieces, and the wiring in such manner that the whole chuck is solid. A chuck formed in this manner possesses great strength, is absolutely waterproof, and is of high economy and efficiency because of the fine insulating qualities of these compounds.

Furthermore, the chuck is exceedingly economical to manufacture since the expensive operation of mounting up the face plate and carefully pounding each line of metal, as was followed in the prior art, is entirely eliminated.

Referring now more particularly to the drawings, which disclose one form embodying my invention, a magnetic chuck is illustrated as comprising a shell formed of side walls 1 and pole pieces 2 integral with the side walls. These pole pieces extend across the top of the chuck or rather extend between the openings in the top of the chuck. Core pole pieces 4 are provided on their upper ends with face plate pole pieces 5 which extend through the openings in the top member and are spaced apart from the poles 2 of the top member. Preferably there are a plurality of pole piece members where the chuck manufactured is a long chuck, and each of these core piece members is adapted to carry an energizing coil 6. These energizing coils are preferably wound to be used upon predetermined voltage, for example, 110 volts, and the terminals of these coils, as will later be specifically explained, are adapted to be so constructed and arranged that they may be connected either in series or in parallel, so that when the coils are connected in parallel, the chuck is adapted for use on a 110 volt circuit, and when the coils are connected in series the chuck is adapted for use on a 220 volt circuit.

In manufacturing this chuck the core pole pieces are set within the shell or housing 1 with the face plate pole pieces 5 extending through the openings between the shell pole pieces 2 and with the parts so arranged they may be mounted on a suitable chuck, for example, some other magnetic chuck, and the work face of both sets of poles ground or machined to a common plane. The parts may then be reversed and the back of the parts brought to a common plane.

After the parts have been assembled as specified with the coils 6 on the core pole pieces 4, a suitable back plate 7 is secured to the core pole pieces 4 and to the housing 1, by means of stub screw bolts 8 so that the parts are definitely and fixedly positioned. The interior of the chuck is now filled with a suitable insulating compound 9 so that the entire chuck comprises a substantially solid mass of material. This insulating compound 9 may comprise a body of bakelite 9 which completely surrounds the coils 6 and also extends between and separates the face plate pole pieces 2 and 5.

Figure 5:
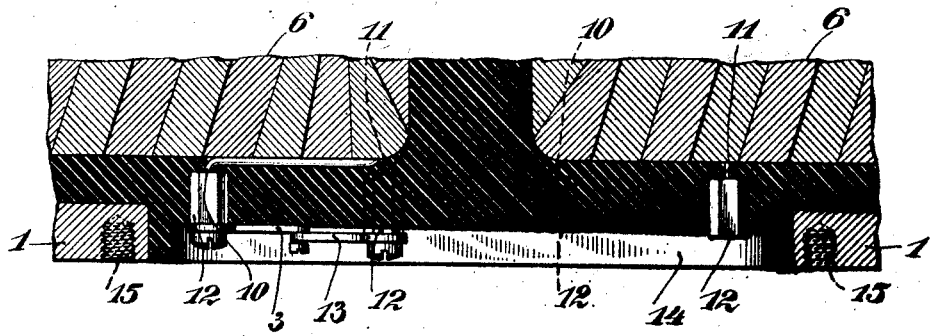
Figure 5 is a detail section of a portion of the front of the chuck showing the connectors for the coils.
Figure 6:
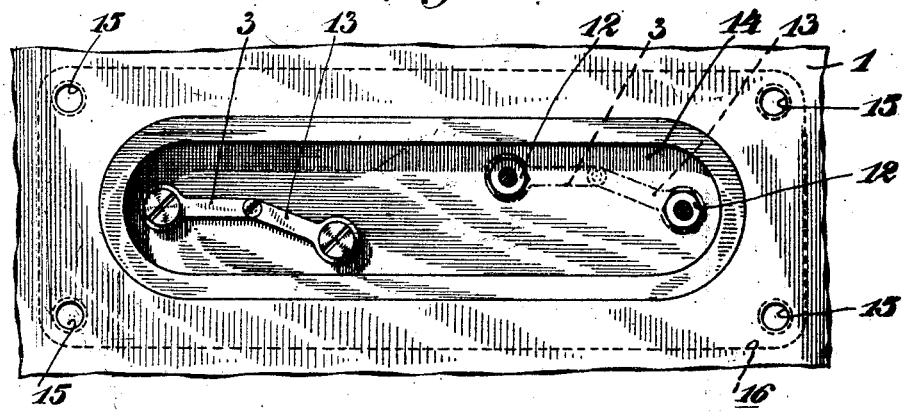
Figure 6 is a front elevational view of the detail shown in Figure 5 and showing in dotted lines one pair of connecting arms removed.

Referring to Figures 5 and 6, the ends 10 and 11 of the coils 6 are connected (preferably soldered) with suitable hexagonal brass screw threaded bodies 12. The bakelite material forms a support for these brass connectors and the bakelite is molded to form a suitable connector block 14 by permitting the bakelite to extend through an opening in the side wall of the shell 1. The connector arms 3 and 13 are connected with the terminals 10 and 11 respectively by means of stub screws set in the hexagonal brass members. Suitable screw bolt openings 15 are also provided adjacent the connector pocket for the reception of mounting screws for a suitable terminal cover 16 indicated in Figure 6 in dotted lines.

Preferably certain of the face plate pole pieces shown in Figure 1 are provided with edges presenting a wave-like appearance, which edges are adjacent the substantially straight edges of the adjacent pole pieces and preferably these wavy edge separation lines between the pole pieces are evenly spaced over the face of the chuck with straight line edges between them. This construction has advantages in that the wavy lines tend to strongly resist the sliding of the work across the face of the chuck when the chuck is energized, whereas the straight lines strongly resist the movement of work lengthwise of the chuck when the chuck is energized. By these two configurations of lines of magnetic force a field of great holding power in both directions is obtained.

From the foregoing it is evident that the chuck constructed in accordance with the present invention will be exceedingly rigid, and will withstand severe treatment and at the same time is thoroughly waterproof and the possibility of water reaching the coils is substantially prevented.

What I claim is:

1. A magnetic chuck comprising two series of pole pieces, an energizing electromagnetic coil operatively mounted relatively to said pole pieces whereby when the coil is energized by a suitable electric current the pole pieces will be energized, and a hard insulating material separating the pole pieces of one series from the pole pieces of the other and completely surrounding and embedding the said coil.

2. A magnetic chuck comprising two series of pole pieces, an energizing electromagnetic coil operatively mounted relatively to said pole pieces whereby when the coil is energized by a suitable electric current the pole pieces will be energized, and phenol condensation insulation separating the pole pieces of one series from the pole pieces of the other and completely surrounding and embedding the said coil.

3. A magnetic chuck comprising two series of poles pieces, an energizing electromagnetic coil operatively mounted relatively to said pole pieces whereby when the coil is energized by a suitable electric current the pole pieces will be energized, and a hard insulating material separating the pole pieces of one series from the pole pieces of the other and completely surrounding and embedding the said coil and supporting the terminals for said coil.

4. A magnetic chuck comprising two series of pole pieces, an energizing electromagnetic coil operatively mounted relatively to said pole pieces whereby when the coil is energized by a suitable electric current the pole pieces will be energized, and a hard insulating material separating the pole pieces of one series from the pole pieces of the other and completely surrounding and embedding the said coil, and a terminal box integral with said material.

5. A magnetic chuck comprising two series of pole pieces, an energizing electromagnetic coil operatively mounted relatively to said pole pieces whereby when the coil is energized by a suitable electric current the pole pieces will be energized, and a hard insulating material separating the pole pieces of one series from the pole pieces of the other and completely surrounding and embedding the said coil and supporting the terminals for said coil, and a terminal box integral with said material.

6. A magnetic chuck comprising in combination a plurality of series of pole pieces, electro-magnetic means for energizing the pole pieces, a housing for supporting the pole pieces, and an insulating material separating the pole pieces of one series from the other and completely filling all of the spaces within said housing whereby the body of said chuck comprises a substantially solid body.

7. A magnetic chuck comprising in combination a plurality of series of pole pieces, electro-magnetic means for energizing the pole pieces, a housing for supporting the pole pieces, and a heat-hardened insulating material separating the pole pieces of one series from the other and completely filling all of the spaces within said housing whereby the body of said chuck comprises a substantially solid body.

8. A magnetic chuck comprising in combination a plurality of series of pole pieces, electro-magnetic means for energizing the pole pieces, and an insulating material separating the pole pieces of one series from the other and completely filling all of the spaces within said housing whereby the body of said chuck comprises a substantially solid body, and a back plate closing the back of said chuck.

9. A magnetic chuck comprising in combination a plurality of series of pole pieces, electro-magnetic means for energizing the pole pieces, a housing for supporting the pole pieces, and an insulating material separating the pole pieces of one series from the other and completely filling all of the spaces within said housing whereby the body of said chuck comprises a substantially solid body, and a back plate closing the back of said chuck, said housing having an opening in a side wall, and a terminal box of said material extending through said opening.

10. A magnetic chuck comprising a plurality of series of pole pieces, electro-magnetic means for energizing the pole pieces, a housing for supporting the pole pieces, and a heat-hardened insulating material separating the pole pieces of one series from the other and completely filling all of the spaces within said housing whereby the body of said chuck comprises a substantially solid body, and a back plate closing the back of said chuck, said housing having an opening in a side wall and a terminal box of said material extending through said opening.

FRANK L. SIMMONS.